United States Patent
El-Din et al.

(10) Patent No.: US 9,842,262 B2
(45) Date of Patent: Dec. 12, 2017

(54) METHOD AND CONTROL DEVICE FOR IDENTIFYING AN OBJECT IN A PIECE OF IMAGE INFORMATION

(71) Applicant: Robert Bosch GmbH, Stuttgart (DE)

(72) Inventors: Omar Alaa El-Din, Hannover (DE); Christian Schwarz, Ehningen (DE); Steffen Brueggert, Hildesheim (DE); Tobias Stumber, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 42 days.

(21) Appl. No.: 14/915,140

(22) PCT Filed: Jul. 23, 2014

(86) PCT No.: PCT/EP2014/065834
§ 371 (c)(1),
(2) Date: Feb. 26, 2016

(87) PCT Pub. No.: WO2015/032544
PCT Pub. Date: Mar. 12, 2015

(65) Prior Publication Data
US 2016/0203372 A1 Jul. 14, 2016

(30) Foreign Application Priority Data
Sep. 6, 2013 (DE) .................. 10 2013 217 827

(51) Int. Cl.
*G06K 9/00* (2006.01)
*B60R 11/04* (2006.01)
(Continued)

(52) U.S. Cl.
CPC .......... *G06K 9/00791* (2013.01); *B60R 11/04* (2013.01); *G06K 9/00818* (2013.01);
(Continued)

(58) Field of Classification Search
CPC .... G06K 9/00818; G06K 9/3241; G06K 9/46; G06K 9/628; B60R 11/04; H04N 7/183
See application file for complete search history.

(56) References Cited

U.S. PATENT DOCUMENTS 6,859,546 B2 * 2/2005 Matsukawa ........ G06K 9/00818
342/90
8,237,731 B2 * 8/2012 Huibers ................. G09G 3/346
345/581

(Continued)

FOREIGN PATENT DOCUMENTS

DE   10 2006 044 595   4/2008
EP   1 220 182         7/2002
(Continued)

OTHER PUBLICATIONS

International Search Report for PCT/EP2014/065834, dated Sep. 25, 2014.

*Primary Examiner* — Shefali Goradia
(74) *Attorney, Agent, or Firm* — Norton Rose Fulbright US LLP; Gerard Messina

(57) ABSTRACT

A method for identifying an object in a piece of image information representing a scene in a detection range of a camera during a situation includes: a step of reading in; a step of selecting; and a step of searching. In the step of reading in, the piece of image information and at least one parameter representing the situation are read in. In the step of selecting, a feature combination of an object class of the object, which is predictably identifiable in the situation, is selected using the parameter. In the step of searching, the feature combination is searched for in the piece of image information to identify the object.

12 Claims, 2 Drawing Sheets

(51) Int. Cl.
*G06K 9/46* (2006.01)
*G06K 9/62* (2006.01)
*H04N 7/18* (2006.01)
*G06K 9/32* (2006.01)

(52) U.S. Cl.
CPC ............ *G06K 9/3241* (2013.01); *G06K 9/46* (2013.01); *G06K 9/628* (2013.01); *H04N 7/183* (2013.01)

(56) References Cited

U.S. PATENT DOCUMENTS

| | | | |
|---|---|---|---|
| 8,705,811 B1* | 4/2014 | Brunner | H04N 5/20 348/169 |
| 2002/0080998 A1* | 6/2002 | Matsukawa | G06K 9/00818 382/103 |
| 2007/0237387 A1 | 10/2007 | Avidan et al. | |
| 2011/0184895 A1 | 7/2011 | Janssen | |
| 2015/0378023 A1* | 12/2015 | Royo Royo | G01S 7/4817 356/5.01 |

FOREIGN PATENT DOCUMENTS

| | | |
|---|---|---|
| EP | 2 575 077 | 4/2013 |
| JP | H09282454 A | 10/1997 |
| JP | 2002259969 A | 9/2002 |
| JP | 2003042718 A | 2/2003 |
| JP | 2009037284 A | 2/2009 |
| JP | 2010239992 A | 10/2010 |
| JP | 2011086261 A | 4/2011 |
| JP | 2011242861 A | 12/2011 |
| WO | 2010103584 A1 | 9/2010 |

* cited by examiner

METHOD AND CONTROL DEVICE FOR IDENTIFYING AN OBJECT IN A PIECE OF IMAGE INFORMATION

BACKGROUND OF THE INVENTION

1. Field of the Invention

The present invention relates to a method for identifying an object in a piece of image information, to a corresponding control device, and to a corresponding computer program product.

2. Description of the Related Art

Driver assistance systems are able to carry out interventions on a vehicle and make recommendations for a driver of the vehicle based on identified objects in the surroundings of the vehicle. The objects may be recorded by a camera and be present in pieces of image information of the camera.

German patent DE 10 2006 044 595 describes a method and an image processing device for segmentation based on contour points in real time. Data reduction enables rapid processing.

BRIEF SUMMARY OF THE INVENTION

Against this background, the present invention introduces a method for identifying an object in a piece of image information, furthermore a control device which uses this method, and finally a corresponding computer program product.

Under changing conditions, such as changing brightness, a changing visibility range or a changing light incidence angle, an object may be depicted very differently by a camera in a piece of image information.

To reliably identify the object in the piece of image information, the object may be searched for using adapted criteria depending on the presently prevailing condition. The different criteria may be represented in different feature descriptions. The feature descriptions may be selected from a range of feature descriptions and be applied depending on the condition.

The approach described here may be illustrated as a simple example based on a delineator post. The delineator post presents a white base body including a stripe accented in black and a reflector to an observer. By daylight, the delineator post may be identified in the piece of image information based on the contrast between its black strip and its white base color, while the reflector provides little visual appeal. In the dark, however, the delineator post is predominantly identifiable in the piece of image information based on the light reflected by the reflector, while the black-white contrast actually only stands out at very short distances. By daylight, the search for delineator posts in the image information may thus be carried out based on the black-white contrast. In the dark, the search may be carried out based on a reflector-characteristic luminous pattern. In this way, delineator posts may be reliably identified both at daylight and in the dark.

Analogously, the criteria for identification may be adapted for other object classes depending on the situation.

A method for identifying an object in a piece of image information is introduced, the piece of image information representing a scene in a detection range of a camera during a situation, the method including the following steps:

reading in the piece of image information and at least one parameter representing the situation;

selecting a feature combination of an object class of the object, which is predictably identifiable in the situation, using the parameter; and searching for the feature combination in the piece of image information to identify the object.

A piece of image information shall be understood to mean electronic image data. The piece of image information may be made up of a plurality of pieces of intensity information of pixels situated in a grid pattern. The piece of image information may represent a depiction of a real scene. The scene may be a perspective view of a section of real surroundings. The section may be at least a portion of the detection range of the camera. An object may be an article which is represented in the piece of image information at least partially identifiably. A situation may characterize a framework condition under which the piece of image information is detected. An object class may be an umbrella term or a collective term for similar objects. Essential features of the objects of an object class may coincide within a tolerance range. A feature combination may include multiple of the features which characterize the object glass. An adapted feature combination may be provided for the particular situation. Two feature combinations for different situations may differ from each other at least in one feature. The object class may be selected as a function of the situation. Objects of different object classes may be searched for in the piece of image information in multiple passages.

An integral image may be read in as a piece of image information in the step of reading in. The integral image may represent a line by line and/or column by column integration of brightness values of pixels of a camera image of the scene. In an integral image, only ascending brightness values are derived from one pixel to the adjoining pixel in one direction, and only descending brightness values are derived in the opposite direction. In the step of searching, simplified processing specifications may thus be used, whereby time for searching may be saved.

In the step of searching, a first feature from the feature combination may be used for checking in a first search step. Subsequently, at least one further feature from the feature combination may be used for checking in at least one further search step. The search for an individual feature may be carried out with the aid of a simplified processing specification, whereby time for searching may be saved.

The further feature for checking may be selected from the feature combination in the further search step using a result of the preceding search step. The features may be selected coordinated with each other. For example, a certain feature may exclude another feature, which is why the other feature no longer needs to be checked. In this way, time for searching may be saved.

An identification probability for the object may be provided. The more features of the feature combination are identifiable in the piece of image information, the greater an identification probability may be provided. An identification probability also allows a response to objects which are not completely identifiable. For example, partially hidden objects are thus identifiable, even if not all features of the feature combination are able to be identified. It is then also possible for multiple object classes to apply to the object and for the selection of possible object classes to be limited.

Pixels of the piece of image information may be marked as the object when a minimum number of features of the feature combination is identified in the pixels. The pixels may be marked as a probably identified object. The probably identified object may be searched for again in a subsequent piece of image information. In this way, a detailed search may be limited to a portion of the piece of image information.

The method may include a step of identifying the situation, the situation being identified using the scene in the piece of image information and/or vehicle data and/or environmental conditions. Due to the identification of the situation in the piece of image information, the method may also be carried out without a dedicated sensor for the situation.

It is furthermore possible to read in a piece of class information of the object class to be identified. In the step of selecting, the feature combination representing the object class may be selected from multiple different feature combinations using the piece of class information. The object search may be deliberately limited to at least one object class if other object classes are not of interest. In this way, the method may be accelerated.

The feature combination may include a piece of information about at least one area sum of the object to be identified. In this way, the method may be carried out quickly and reliably.

A control device for identifying an object in a piece of image information is introduced, the piece of image information representing a scene in a detection range of a camera during a situation, the control device including the following features:

an interface for reading in the piece of image information and at least one parameter representing the situation;
a unit for selecting a feature combination of an object class of the object, which is predictably identifiable in the situation, using the parameter; and
a unit for searching for the feature combination in the piece of image information to identify the object.

The object of the present invention may also be achieved quickly and efficiently by this embodiment variant of the present invention in the form of a control device.

A control device within the present context may be understood to mean an electrical device which processes sensor signals and outputs control and/or data signals as a function thereof. The control device may include an interface which may be designed as hardware and/or software. In the case of a hardware design, the interfaces may, for example, be part of a so-called system ASIC which includes a wide variety of functions of the control device. However, it is also possible for the interfaces to be separate integrated circuits, or to be at least partially made up of discrete elements. In the case of a software design, the interfaces may be software modules which are present on a microcontroller, for example, in addition to other software modules.

In addition, a computer program product is advantageous, having program code which may be stored on a machine-readable carrier such as a semiconductor memory, a hard disk memory or an optical memory, and which is used to carry out the method according to one of the specific embodiments described above, if the program product is executed on a computer or a device.

The present invention is described in greater detail hereafter based on the accompanying drawings by way of example.

DETAILED DESCRIPTION OF THE INVENTION

Figure 1:
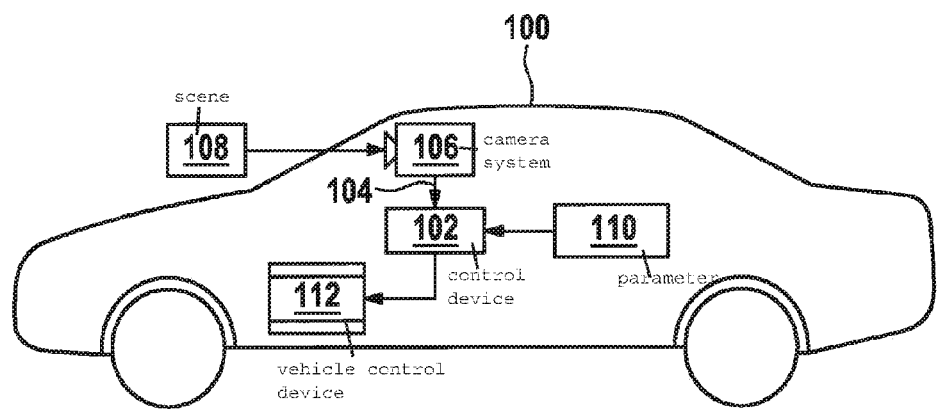
FIG. 1 shows a representation of a vehicle including a control device for identifying an object in a piece of image information according to one exemplary embodiment of the present invention.

In the following description of favorable exemplary embodiments of the present invention, identical or similar reference numerals are used for similarly acting elements shown in the different figures, and a repeated description of these elements is dispensed with.

FIG. 1 shows a representation of a vehicle 100 including a control device 102 for identifying an object in a piece of image information 104 according to one exemplary embodiment of the present invention. Piece of image information 104 is generated by a camera 106, which is installed in vehicle 100 here and directed at a detection range ahead of vehicle 100. Camera 106 is designed to depict a scene 108 in the detection range in piece of image information 104. Control device 102 includes an interface for piece of image information 104 and an interface for at least one parameter 110. Parameter 110 represents a situation in which camera 106 detects scene 108.

In one exemplary embodiment, parameter 110 is a vehicle speed.

In one exemplary embodiment, parameter 110 is an illumination intensity.

In one exemplary embodiment, parameter 110 is a weather condition.

Control device 102 is designed to identify the object using parameter 110. For this purpose, control device 102 selects a feature combination which fits parameter 110 best from a number of different feature combinations of an object class to be identified. In this way, for example, different features may be used for object identification in the dark than during daylight. The object may also have a different appearance in rain than in sunshine. By focusing on the respective best suited features, reliable object identification is made possible. A position of the identified object in scene 108 is forwarded to other vehicle control devices 112 for further use.

In one exemplary embodiment, control device 102 is implemented in an on-board computer of vehicle 100.

In one exemplary embodiment, control device 102 is implemented in a camera control device of vehicle 100.

In one exemplary embodiment, control device 102 is implemented in a navigation control device of vehicle 100.

Piece of image information 104 of scene 108 including objects in front of camera system 106 is read in via a data interface. Vehicle and system data, such as a speed of vehicle 100, are also read in as parameter 110 via the interface.

In other words, FIG. 1 according to one exemplary embodiment shows a use of FPGA-based (field programmable gate array) weighted area sums for object identification in video images.

Objects in camera images may be identified from the combination of sums via surface areas and their linear linkages. These object identifiers may be trained with the aid of learning methods to achieve a good identification rate at a low false alarm rate. The approach presented here reduces the arithmetic complexity of these methods, improves their suitability for the use with real-time driver assistance systems (DAS) and enables a high processing speed and a prompt response to objects from the real world.

The approach presented here introduces a method for FPGAs 102 which is able to meet the object identification task in real time and thus allows its use in the automotive DAS environment in the first place.

For this purpose, specialized area sum features and an FPGA-based processing unit 102 for these features are introduced here, which allow a real time object identification. The great advantage of the proposed approach is its reloadability at run time, which allows a situation-dependent identification of objects, e.g., switching in the event of a change in the weather or lighting conditions.

Camera system 106 is attached in vehicle 100 and records present scene 108 ahead of vehicle 100. Camera system 106 may include one or multiple camera sensors. The system transmits its image data 104 to one or multiple processing units 102 having an installed FPGA via an interface, which may have a wired or wireless design. For example, the FPGA may also be integrated into on-board computer 112, combination instrument 112, camera control device 112 and/or navigation system 112.

Figure 2:
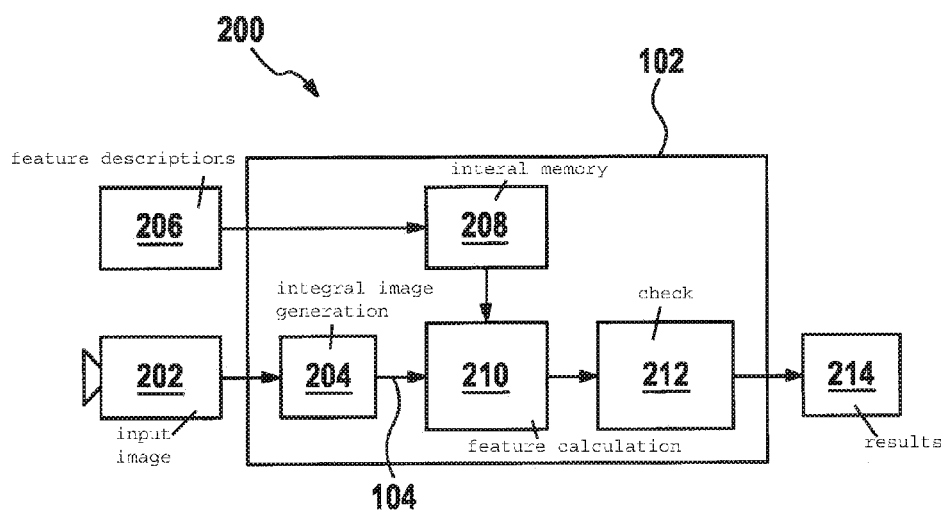
FIG. 2 shows a graphic representation of a method sequence for identifying an object in a piece of image information according to one exemplary embodiment of the present invention.

FIG. 2 shows a graphic representation of a method sequence 200 for identifying an object in a piece of image information 104 according to one exemplary embodiment of the present invention. Method sequence 200 may be carried out on a control device 102, as it is shown in FIG. 1. In the method according to one exemplary embodiment of the present invention, piece of image information 104 is processed from an input image 202 with the aid of an integral image generation 204 here. Feature descriptions 206 are stored in a memory 208 of control device 102. Memory 208 is an FPGA-internal memory 208 here. For a feature calculation 210, piece of image information 104 and feature descriptions 206 from memory 208 are accessed. The results of feature calculation 210 are checked via a cascading and linkage 212 and are output as results 214 when check 212 is successful.

In one exemplary embodiment, the data processing is carried out on FPGA 102 as shown as a block diagram in FIG. 2. Description 206 of the area sum features is loaded into internal memory 208 of FPGA 102. Input image 202 of the camera system is read into FPGA 102. A summed area table (integral image) 104 is generated 204. Feature descriptions 206 stored in FPGA 102 are applied to the data of summed area table 104 for feature calculation 210. The results of feature calculations 210 are linked and subsequently cascaded 212. In this way, a response 214 on whether or not an object is present may be supplied for every image position. Results 214 of the analysis are output for further processing.

In one exemplary embodiment, feature descriptions 206 are written into FPGA-internal memory 208 prior to the processing of an image 104. Prior to their use on FPGA 102, feature descriptions 206 have been trained for certain objects. To be able to detect different object classes in consecutive images 104, it is possible to also newly write feature descriptions 206 into FPGA-internal memory 208 prior to each new image 104.

In one exemplary embodiment, summed area table (integral image) 104 is calculated based on input image 202 and due to its properties makes a simplified calculation basis possible in the subsequent processing 210.

In one exemplary embodiment, feature calculation 210 analyzes feature descriptions 206 stored in the FPGA-internal memory 208 and extracts the characterized features from summed area table (integral image) 104.

In one exemplary embodiment, linkage 212 of the previously calculated features is established by feature descriptions 206 in FPGA-internal memory 208. A tree structure is created by linkage 212 of the features, which is combined and cascaded in stages. After every stage, it is decided whether the cascade is continued or aborted. When all stages of the cascade have been successfully passed through, a possible object is situated at the present position. The hardware classification is calculated for every pixel position of the input image and thus determined for every pixel position, whether a possible object exists or not. Resolution losses due to filter matrices are taken into consideration.

In one exemplary embodiment, a feature description 206 shall, figuratively speaking, be understood to mean a table which in the first column contains a consecutive number for distinguishing different features for a classification. In the following columns, this table then contains values for feature comparisons which make a partial or complete identification of an object in an image 104 possible. The final column then contains an instruction for further processing. This instruction may be a new line of the column, for example, or else an output of the result.

In one exemplary embodiment, an integral image 104 shall be understood to mean an image which is calculated based on an image 202 recorded by a camera. The pixel value of integral image 104 is formed as a function of all pixel values above it and to its left. From this it is derived that the pixel value in the bottom right pixel is an average across all pixel values of the image. It is further derived that the pixel value of the top left pixel corresponds to that of original image 202.

The elements referred to as feature descriptions 206 in the approach described here may be replaced during a run time of the PGA. This, in turn, may advantageously be made dependent on external parameters, such as weather conditions and/or lighting conditions, for example.

Figure 3:
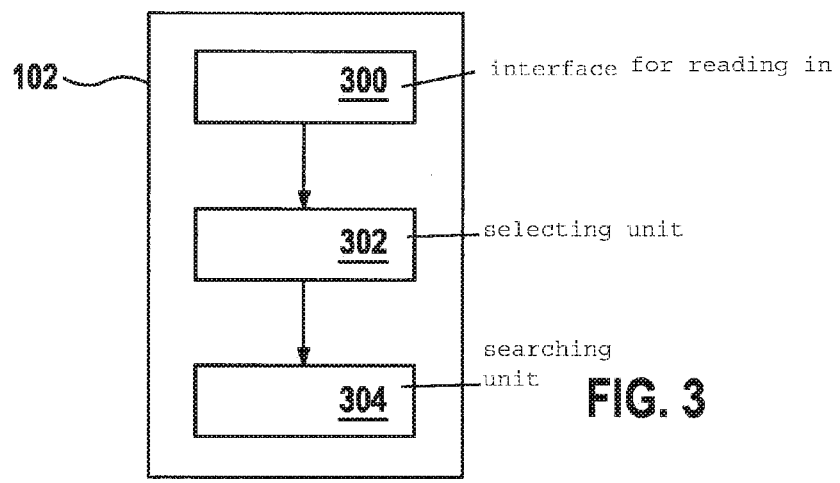
FIG. 3 shows a block diagram of a control device for identifying an object in a piece of image information according to one exemplary embodiment of the present invention.

FIG. 3 shows a block diagram of a control device 102 for identifying an object in a piece of image information according to one exemplary embodiment of the present invention. Control device 102 includes an interface 300 for reading in, a unit 302 for selecting, and a unit 304 for searching. The piece of image information represents a scene in a detection range of a camera during a situation. Interface 300 is designed to read in the piece of image information and at least one parameter representing the situation. Unit 302 for selecting is designed to select a feature combination of an object class of the object, which is predictably identifiable in the situation, using the parameter. Unit 304 for searching is designed to search for the feature combination in the piece of image information to identify the object.

Control device 102 is in particular designed to be used in a vehicle, as it is shown in FIG. 1.

Figure 4:
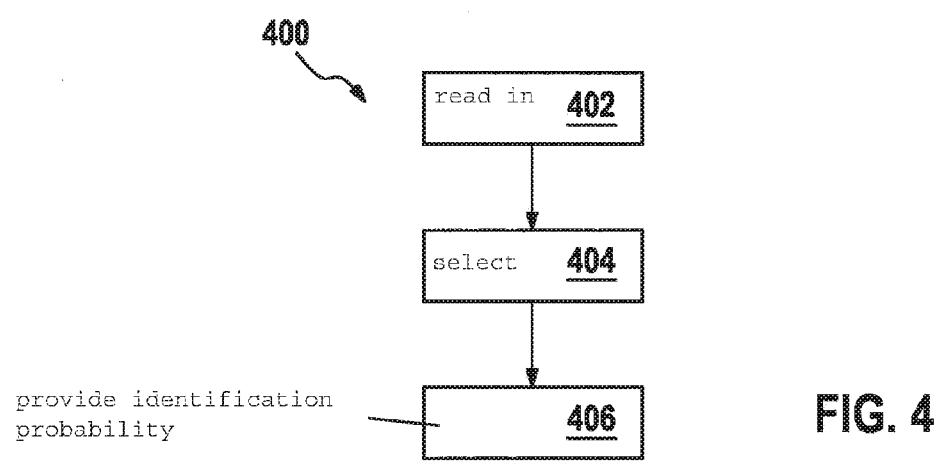
FIG. 4 shows a flow chart of a method for identifying an object in a piece of image information according to one exemplary embodiment of the present invention.

FIG. 4 shows a flow chart of a method 400 for identifying an object in a piece of image information according to one exemplary embodiment of the present invention. Method 400 includes a step 402 of reading in, a step 404 of selecting, and a step 406 of searching. The piece of image information represents a scene in a detection range of a camera during a situation. In step 402 of reading in, the piece of image information and at least one parameter representing the situation are read in. In step 404 of selecting, a feature combination of an object class of the object, which is predictably identifiable in the situation, is selected using the parameter. In step 406 of searching, the feature combination is searched for in the piece of image information to identify the object.

In one exemplary embodiment, an integral image is read in as a piece of image information in step 402 of reading in. Here, the integral image represents a line by line and/or column by column integration of brightness values of pixels of a camera image of the scene.

In one exemplary embodiment, a first feature from the feature combination is used for checking in step 406 of searching in a first search step. Thereafter, at least one further feature from the feature combination is used for checking in at least one further search step.

In one exemplary embodiment, the further feature for checking is selected from the feature combination in the further search step using a result of the preceding search step.

In one exemplary embodiment, an identification probability for the object is provided in step 406 of searching. The more features of the feature combination are identifiable in the piece of image information, the greater an identification probability is provided.

In one exemplary embodiment, pixels of the piece of image information are marked as the object in step 406 of searching when a minimum number of features of the feature combination is identified in the pixels.

In one exemplary embodiment, the method includes a step of identifying the situation. The situation is identified using the scene in the piece of image information and/or vehicle data and/or environmental conditions.

In one exemplary embodiment, a piece of class information of the object class to be identified is furthermore read in in step 402 of reading in. In step 404 of selecting, the feature combination representing the object class is selected from multiple different feature combinations using the piece of class information.

In one exemplary embodiment, the feature combination includes a piece of information about at least one area sum of the object to be identified.

The described exemplary embodiments shown in the figures are selected only by way of example. Different exemplary embodiments may be combined with each other completely or with respect to individual features. It is also possible to supplement one exemplary embodiment with features of another exemplary embodiment.

Moreover, method steps according to the present invention may be carried out repeatedly and in a different order than the one described.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for identifying an object in a piece of image information representing a scene in a detection range of a camera during a situation, the method comprising:
   reading in, by a data interface of a control device, the piece of image information from the camera and at least one parameter representing the situation;
   selecting, by the control device, a feature combination of an object class of the object, which is predictably identifiable in the situation, using the parameter;
   searching, by the control device, for the feature combination in the piece of image information to identify the object; and
   using the identification of the object in a real-time driver assistance system in a vehicle;
   wherein an integral image is read in as the piece of image information, the integral image representing at least one of a line-by-line and a column-by-column integration of brightness values of pixels of a camera image of the scene; and
   wherein the searching includes at least a first search step and a second search step, and wherein a first feature from the feature combination is used for checking in the first search step, and subsequently at least one further feature from the feature combination is used for checking in the second search step.

2. The method as recited in claim 1, wherein the at least one further feature for checking is selected from the feature combination in the second search step using a result of the first search step.

3. The method as recited in claim 1, wherein an identification probability for the object is provided in the searching, and wherein the greater an identification probability is provided, the more features of the feature combination are identifiable in the piece of image information.

4. The method as recited in claim 1, wherein pixels of the piece of image information are marked as the object in the searching when a minimum number of features of the feature combination is identified in the pixels.

5. The method as recited in claim 1, further comprising:
   identifying the situation using at least one of (i) the scene in the piece of image information, (ii) vehicle data, and (iii) environmental conditions.

6. The method as recited in claim 1, wherein:
   in the step of reading in, a piece of class information of the object class to be identified is additionally read in; and
   in the step of selecting, the feature combination representing the object class is selected from multiple different feature combinations using the piece of class information.

7. The method as recited in claim 1, wherein the feature combination includes a piece of information about at least one area sum of the object to be identified.

8. The method as recited in claim 1, wherein the control device is control device of a navigation control system of the vehicle.

9. The method as recited in claim 1, wherein the control device is a control device of a camera system.

10. The method as recited in claim 1, wherein the at least one parameter includes a speed of the vehicle.

11. A control device for identifying an object in a piece of image information representing a scene in a detection range of a camera during a situation, the control device comprising:
    an interface configured for reading in the piece of image information from the camera and at least one parameter representing the situation, the reading in including reading in an integral image as the piece of image information, the integral image representing at least one of a line-by-line and a column-by-column integration of brightness values of pixels of a camera image of the scene;
    a selection unit configured for selecting a feature combination of an object class of the object, which is predictably identifiable in the situation, using the parameter; and a searching unit configured for searching for the feature combination in the piece of image information to identify the object, the searching including at least a first search and a second search, and wherein a first feature from the feature combination is used for checking in the first search, and subsequently at least one further feature from the feature combination is used for checking in the second search;

wherein the identification of the object is forwarded to and used by a real-time driver assistance system in a vehicle.

12. A non-transitory, computer-readable data storage medium storing a computer program having program codes which, when executed on a computer, perform a method for identifying an object in a piece of image information representing a scene in a detection range of a camera during a situation, the method comprising:

reading in, by a data interface of a control device, the piece of image information from the camera and at least one parameter representing the situation;

selecting a feature combination of an object class of the object, which is predictably identifiable in the situation, using the parameter; and searching for the feature combination in the piece of image information to identify the object; and using the identification of the object in a real-time driver assistance system in a vehicle;

wherein an integral image is read in as the piece of image information, the integral image representing at least one of a line-by-line and a column-by-column integration of brightness values of pixels of a camera image of the scene; and wherein the searching includes at least a first search step and a second search step, and wherein a first feature from the feature combination is used for checking in the first search step, and subsequently at least one further feature from the feature combination is used for checking in the second search step.

* * * * *